May 31, 1960  H. S. HEMSTREET ET AL  2,938,279
MEANS FOR PRODUCING VISUAL DISPLAY IN
GROUNDED AIRCRAFT TRAINERS
Filed Sept. 21, 1954  6 Sheets—Sheet 1

United States Patent Office 2,938,279
Patented May 31, 1960

2,938,279

MEANS FOR PRODUCING VISUAL DISPLAY IN GROUNDED AIRCRAFT TRAINERS

Harold S. Hemstreet, Binghamton, and Robert A. Woodson, Vestal, N.Y., assignors to General Precision, Inc., a corporation of Delaware Filed Sept. 21, 1954, Ser. No. 457,514

33 Claims. (Cl. 35—12)

This invention relates to training aircraft pilots on the ground, and more particularly to methods and means for projecting visual displays of terrestrial images in a grounded aviation trainer to simulate the appearance of the earth's surface as viewed from an aircraft in flight. The invention comprises means including an optical system combined with a flight simulator to produce in a relatively small space very realistic images of topographic features of terrain over which a simulated flight is conducted.

Although grounded aviation trainers and flight simulators have heretofore been devised for the instruction of aircraft personnel in the techniques and procedures of instrument flight, sometimes referred to as "blind flying," such prior training devices have not realistically simulated the conditions of "contact flight" in which the pilot controls his aircraft according to his visual observation of the earth's surface over which he is flying.

With the increasing used of rotary wing types of aircraft, such as helicopters, autogyros and convertiplanes, wherein only limited instrumentation may be provided and the pilot must rely primarily on visual contact with the earth, the need has arisen for a grounded trainer providing realistic visual simulation of terrain as viewed from such an aircraft in flight. Because the maneuvers of hovering, and lateral or backward movement which are possible in rotary wing aircraft, bear little or no similarity to any of the more familiar maneuvers of conventional fixed wing aircraft, the training of helicopter pilots requires much time and practice in these maneuvers. As the performance of such maneuvers close to the surface of the earth is extremely difficult and hazardous for unskilled persons, it is especially desirable that means be provided whereby helicopter pilots may gain experience in these maneuvers safely and economically, as in a grounded flight simulator.

Any device intended for the training of pilots in the art of flying by visual reference should, in one way or another, present a visual display such as a picture on a screen, and this display should provide a pilot with information which is equivalent for training purposes to that information or those "cues" which he would obtain in the actual aircraft by looking through the windows or windshield.

A grounded aviation trainer adapted for the instruction of students in contact flight maneuvers, particularly in simulated rotary wing aircraft, is disposed in the copending application of Harold S. Hemstreet, Serial No. 419,954, filed March 31, 1954, now Patent 2,885,792 and assigned to the same assignee as the present application. Said prior application discloses means for projecting onto a screen an image representing a runway or aircraft carrier deck as viewed from different attitudes and different positions by a student in a simulated aircraft. In the copending application of Robert L. Smith and Harold S. Hemstreet, Serial No. 421,255, filed April 6, 1954, now Patent 2,890,528 and assigned to the same assignee as the present invention, means for presenting visual indications of aircraft attitude and position as shown on the screen of a cathode ray tube are disclosed. While the image means of both of these prior applications are quite useful in the training of helicopter pilots, the visual images presented thereby do not contain as much or as detailed information as a pilot actually obtains by looking at the ground topography over which he is maneuvering, and the visual means shown in copending application, Serial No. 421,255, is unsuited to the training of high speed fixed wing aircraft pilots in contact flight maneuvers.

The present invention provides means whereby more detailed visual displays, including photographic images of actual topographic features, may be projected onto a screen and controlled in response to simulated flight maneuvers to produce a more realistic simulation of contact flight by visual reference. The method of producing and controlling visual displays in the present invention is useful not only in the training of helicopter pilots, but also may be employed to simulate contact flight maneuvers in either rotary wing or fixed wing types of aircraft.

The basic references used by a pilot in visual flight are the ground and the horizon. Because of the slower speed and greater maneuverability of helicopters, and other rotary wing aircraft, visual reference to the horizon assumes less importance than reference to the ground topography in the immediate vicinity of the aircraft position. The problem of producing a visual display in a helicopter trainer thus becomes one of producing a picture of the ground topography and of objects in a horizontal plane on the ground.

One way in which the desired picture may be produced is to project photographic images onto a horizontal screen. This picture might be an actual scale model of the ground area to be simulated, in which rectangular objects on the ground would be projected onto the horizontal screen as rectangular objects without distortion. While such a horizontal screen may be positioned a short distance below eye level, thus permitting the picture on the screen to be correspondingly smaller than the actual ground object portrayed, it will be readily apparent that the screen would have to be of very great size if the image projected thereon is to represent both close-up portions of the terrain and also more distant topographic features extending out towards the horizon. This difficulty is overcome in the present invention by employing an inclined projection screen and projecting thereon an image having controlled keystone distortion so that the image as viewed has no perspective distortion when observed from the student pilot's position.

It is therefore an object of the invention to provide improved methods for producing a visual illusion of flight in grounded flight simulation.

It is another object of the invention to provide improved means for visually simulating topographic characteristics of surface terrain as viewed by a student in a simulated aircraft training device.

A more particular object of the invention is to provide improved means for projecting images of horizontal objects onto a screen in such relation to a simulated aircraft training device that a student may be enabled to perform simulated contact flight maneuvers by visual reference to the projected images.

Another object of the invention is to provide improved means for optically projecting photographic images of actual surface terrain and for producing realistically controlled motion of such images relative to a simulated aircraft, in response to flight control manipulation by a student.

A further object of the invention is to provide such realistic simulation of visual contact flight maneuvers for training pilots in the operation of helicopter and other rotary wing types of aircraft.

Other objects of the invention will in part be obvious and will in part appear hereinafter.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

For a fuller understanding of the nature and objects of the invention reference should be had to the following detailed description taken in connection with the accompanying drawings, in which.

Figure 1:
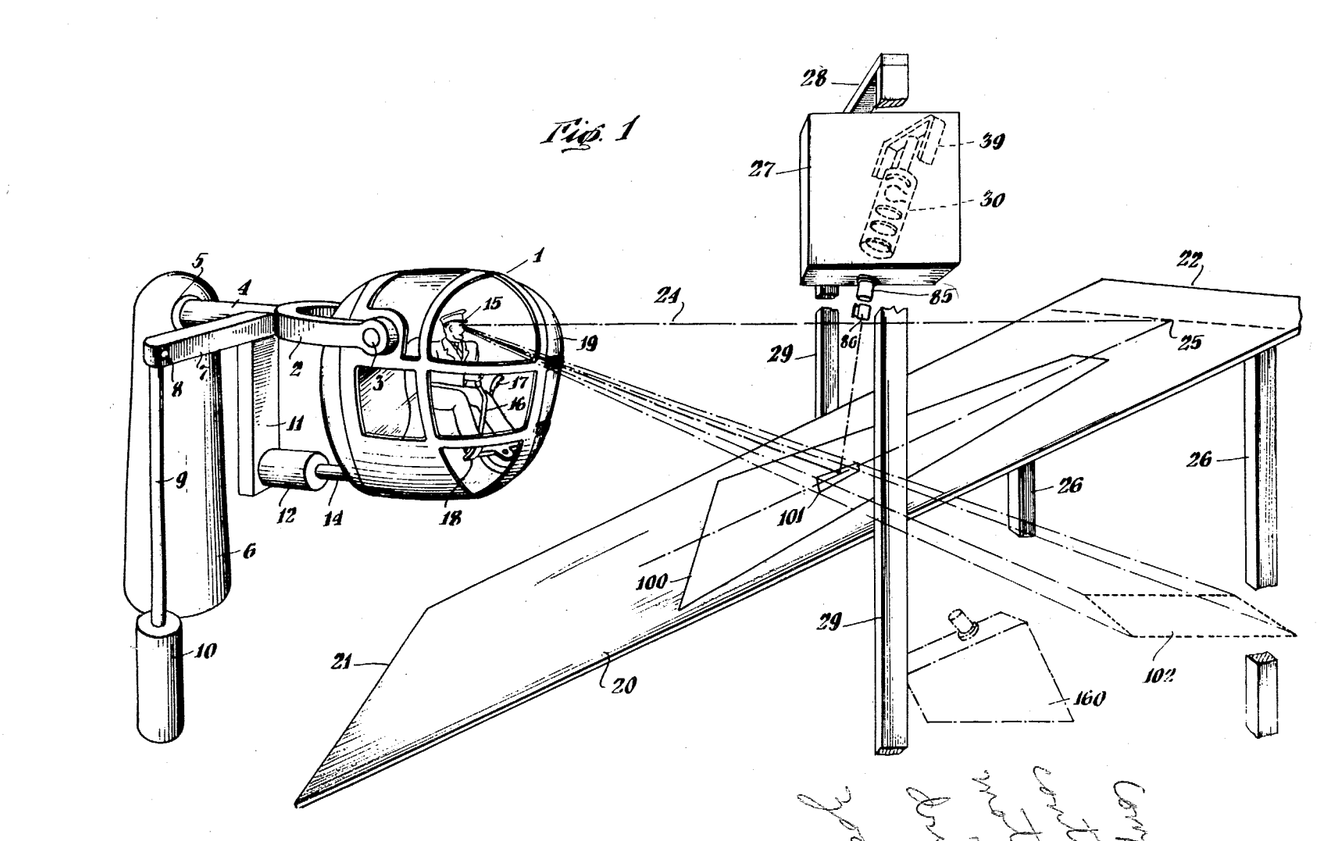
Fig. 1 represents in perspective view one embodiment of the training apparatus of the invention, with an alternative embodiment disclosed in broken lines.

Referring now in greater detail to Fig. 1 of the drawings, a mock-up cockpit 1, simulating the cockpit enclosure of an aircraft, is supported by a horizontal yoke 2 carrying laterally disposed pivots 3 which are affixed to either side of the cockpit 1 in such a position that the pivotal axis 3 passes laterally through the position normally occupied by the eye 15 of a trainee seated in the operator's position within the cockpit 1. The yoke 2 is rotatably supported by rearwardly extending horizontal shaft 4 mounted in the horizontal bearing 5 of vertical upright 6. The axis of shaft 4 also passes through the viewpoint 15 of a trainee seated within the cockpit 1. A laterally extending horizontal arm 7 which is rigidly affixed to the shaft 4 and integral with the yoke 2 is pivotably connected at 8 with a vertical piston shaft 9, the opposite end of which connects with hydraulic cylinder 10. Operation of hydraulic cylinder 10 upon piston shaft 9, rotates shaft 4 and yoke 2 through arm 7 to impart rolling motion to the cockpit 1 about the horizontal axis of shaft 4.

Integral with shaft 4 and yoke 2, and carried thereby, is normally vertical arm 11, the lower end of which carries horizontally disposed cylinder 12. Horizontal piston 14, operated by hydraulic cylinder 12, and pivotably connected to the lower portion of cockpit 1 operates to rotate the cockpit 1 about the lateral axis 3, to impart pitching motion to the trainee's cockpit 1. As the axes of shafts 3 and 4 intersect within the cockpit 1 at the point 15, at approximately the eye position of a trainee seated within the cockpit, rolling and pitching motions imparted to the cockpit 1, by operation of cylinders 10 and 12 respectively, are about the viewpoint 15 of the trainee seated therein, and such angular motions of the cockpit 1 simulate the rolling and pitching motions of an aircraft in flight.

A student pilot seated within the cockpit 1 is provided with a simulated cyclic pitch control 16 normally located just forward of the pilot's seat, a collective pitch control 17 normally placed to the left of the pilot's seat, and a pair of rudder control pedals 18—18 by which the student may maneuver the training device in simulated flight. While the cockpit and controls disclosed in Fig. 1 of the drawing represent the basic flight controls normally provided in a helicopter or other rotary wing type of aircraft, it is to be understood that the cockpit and controls may be adapted to simulate any desired type of aircraft, having either a rotary wing or a fixed wing. Additional controls and appropriate flight instruments, as for example a compass, an altimeter, r.p.m. indicator, etc., may also be provided within the cockpit 1.

Through a transparent windshield 19, the student pilot may observe an inclined projection screen 20. The lower end 21 of screen 20 preferably extends beneath the cockpit 1 and the upper end 22 of screen 20 may be curved upwardly or may be joined to a section of vertical screen, if desired. The upper end 22 of screen 20 may extend above the horizontal line of sight 24 from the observer's viewpoint 15. The point 25 represents a point lying on the simulated horizon as seen from viewpoint 15 within the cockpit 1. The elevated end 22 of inclined screen 20 may be supported by vertical stanchions 26—26 or may be secured to the vertical wall of a room in which the training device is installed.

Above the approximate center of the inclined screen 20 is positioned an optical projector mechanism indicated generally at 27, which may be fastened to the ceiling of a room in which the training device is placed or may be mounted on a horizontal overhead member 28 supported by wide-spaced vertical stanchions 29—29. For convenience in the drawing of Fig. 1, the projector 27 is shown positioned only a slight distance above the horizontal line of sight 24, but it is to be understood that the projector 27 may be mounted in a relatively higher position, substantially above the normal line of sight of a trainee in the cockpit.

Figure 2:
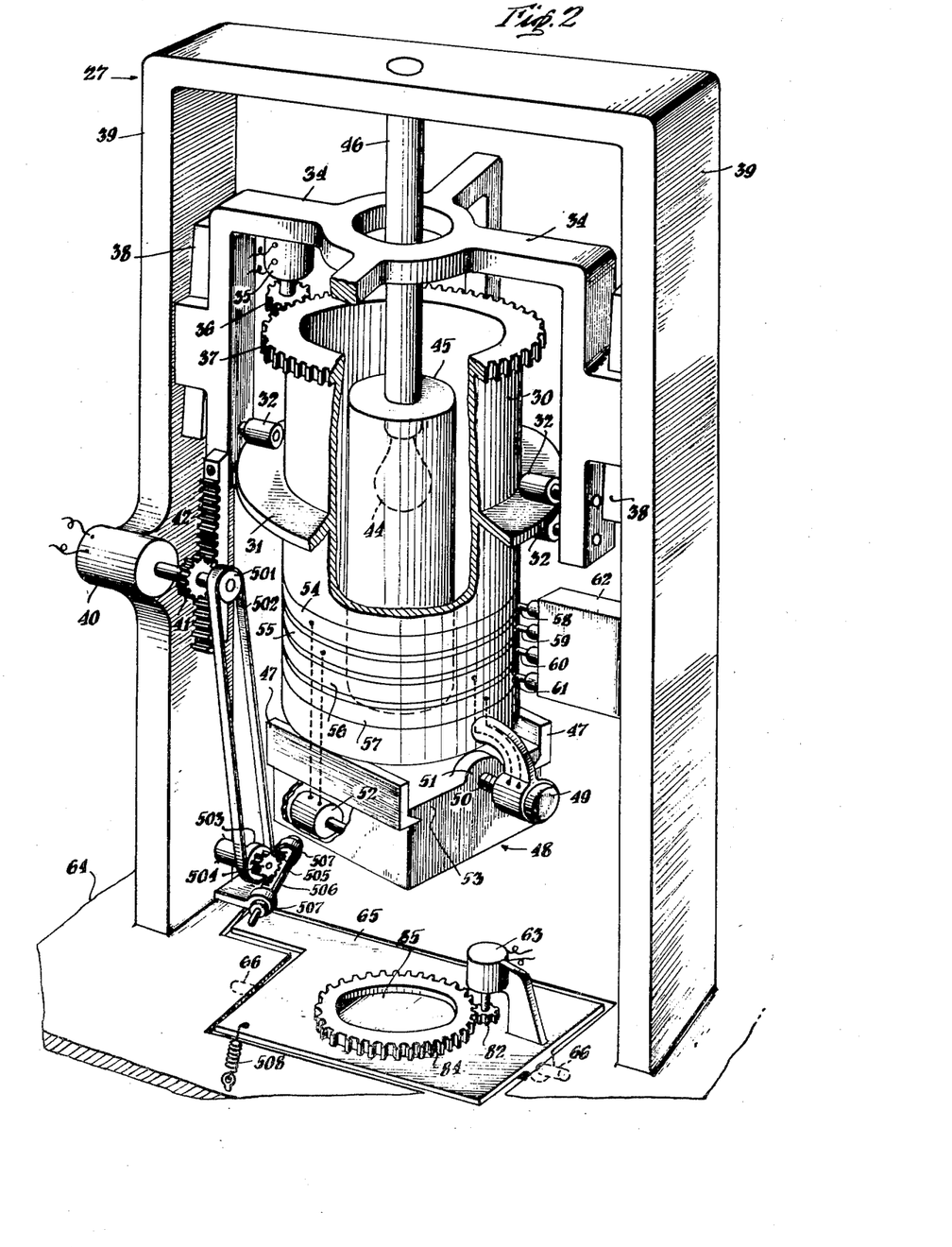
Fig. 2 is a detailed perspective view of the optical projector shown generally in Fig. 1, with a portion thereof cut away to show internal parts, and showing also a portion of the image transparency transport mechanism.

Referring now in greater detail to Fig. 2 of the drawings, the optical projector 27 includes a hollow cylinder 30 having an annular flange 31 supported between roller bearings 32—32 which are carried by a four-leg spider member 34. Cylinder 30 is rotatable within spider frame 34, being guided by bearings 32 and driven in rotation by reversible motor 35, which carries pinion 36 in engagement with external ring gear 37 forming an annular flange at the upper end of cylinder 30. Motor 35 is rigidly affixed to the frame 34. The spider frame member 34 is slidably supported by guide members 38—38 affixed to the inner faces of a vertical yoke support member 39.

The entire spider frame 34, carrying motor 35 and rotatable cylinder 30, is adapted to be slidably moved in a generally vertical direction, either up or down, within frame 39 by operation of reversible motor 40 which is rigidly affixed to the yoke 39. Motor 40 carries on its rotatable shaft pinion 41 in engagement with rack 42 affixed to the spider member 34, whereby vertical motion may be imparted to rotatable cylinder 30.

Within the hollow center of cylinder 30, a source of illumination 44, including a collimating condenser lens system 45 is supported by vertical shaft 46 which is rigidly affixed to the upper portion of yoke 39. Electrical connections (not shown) pass through the shaft 46 to supply power to the illumination source 44.

A pair of parallel guide bars 47—47 are rigidly affixed to the lower end of cylinder 30 as, for example, by welding. A film transport compartment indicated generally at 48 is slidably mounted between the guide bars 47—47 and is adapted to be moved in lateral translation by operation of reversible motor 49. Motor 49 is rigidly affixed to cylinder 30 and drives a screw shaft 50 engaged with screw follower 51 mounted in film carriage 53 of compartment 48 whereby the film transparency within compartment 48 may be moved laterally with respect to cylinder 30. The film compartment 48 carries within its enclosure another reversible motor 52 which may be seen through the cut-away side portion of compartment 48 in Fig. 2. The function of motor 52 and its associated parts will be described hereinafter with reference to Fig. 2A of the drawings. The lateral motions of the film, which are imparted by motors 49 and 52, are in a plane which is perpendicular to the axis of rotation of supporting cylinder 30.

Electrical power for motors 49 and 52 is supplied through two pairs of slip rings, 54—55 and 56—57, respectively, which are affixed to the outer surface of cylinder 30 and insulated therefrom and from each other. Slip rings 54–57 are engaged respectively by brushes 58 through 61 which are insulatedly mounted by bracket 62 supported on an upright arm of yoke 39. Slip rings 54–57 are of sufficiently greater width than the bearing surfaces of brushes 58–61 to allow the required degree of vertical motion of cylinder 30 without interrupting electrical contact between the brushes and their respective slip rings.

The upright members of yoke 39 are rigidly affixed at their lower extremities to the baseboard 64, being canted rearwardly as viewed in Fig. 2 of the drawings (to the right as illustrated by the dotted line representation in Fig. 1). The angle at which the supporting structure 39 is tilted with respect to the baseboard 64 is determined by the optical axis of the projection lens 85 (represented by axis 90 in Fig. 3). The axis of the collimated illumination source 44—45, and its supporting shaft 46 should preferably coincide with the optical axis of the projection lens 85. It will be noted that as supporting shaft 46 is rigidly affixed to the yoke 39, the distance between illumination source 44 and the projection lens 85 remains constant regardless of motions which may be imparted to the cylinder 30 as described above.

In the structure of Fig. 2, cylinder 30 is not mounted concentrically with the collimated light source 44—45, but the guide bars 38—38 on yoke 39 are set at an angle such that the supporting spider 34 and the cylinder 30 carried thereby are moved along axis 92 (Fig. 3), so that the plane of the film transparency carried within compartment 48 remains parallel to the original film plane, whenever the motor 40 is energized. The axis 92 (Fig. 3) and the axis of rotation, 91, of cylinder 30 always intersect the film plane at the same point, 94. The reasons for this structural arrangement will be more readily understood from the detailed description of the optical system in reference to Fig. 3 hereinafter.

Below the film carrier compartment 48 in Fig. 2, the optical projection lens 85 is mounted in tiltable lens board 65, which is tiltably mounted in baseboard 64 by bearings 66—66.

A belt drum 501 is mounted concentric with pinion 41 and rotates with pinion 41. Endless belt or cable 502, driven by drum 501, in turn drives drum 503. Pinion 504 is mounted on a fixed center and rotates with drum 503. Pinion 504 engages rack 505 which is rigidly mounted on slide member 506. The slide 506 is guided by supports 507—507. A spring 508 holds lens board 65 firmly against the lower tip of slide member 506. Rotation of pinion 41 thus causes a rotation of lens 85 about axis 66—66. In particular the direction of motion of sliding member 506 is parallel to the plane of the screen on which lens 85 projects. Speed of movement of member 506 is determined by the relative diameters of drums 501 and 503 and the pinion 504. The required angle of lens board tilt and the reasons therefor will be more readily understood by reference to the detailed description of Fig. 3 hereinafter.

Mounted on lens board 65 is motor 63 which drives pinion 82 engaged with the external ring gear 84 to vary the focal length of projection lens 85 simultaneously with operation of motor 40 to raise or lower the film carrier compartment 48. Motors 40 and 63 are connected to the output of altitude computer 107 (Fig. 4) and their combined operation results in varying the magnification of projected images to simulate changes in flight altitude. Motor 35 is connected to the output of heading computer 104 (Fig. 4) and operates to rotate projected images in simulation of changes in aircraft heading. Motor 49 is connected to the output of roll and lateral position computer 105 (Fig. 4) and operates to shift projected images laterally to simulate aircraft movement in a predetermined direction over the ground. Motor 52 is connected to the output of the pitch and fore-aft position computer 106 (Fig. 4) and operates to shift projected images laterally in simulation of aircraft motion over the ground in a direction at right angles to the motion imparted by motor 49.

In order to project a uniformly illuminated image using a non-uniform light source, the position of illumination source 44 within movable cylinder 30 should preferably remain fixed with respect to the entrance pupil of projection lens 85, and the source 44 should not move when the cylinder 30 is raised or lowered by operation of motor 40 or when cylinder 30 is rotated by operation of motor 35. As mentioned above, this relationship is maintained by the structure of Fig. 2. With this arrangement, the image of the filament of projection lamp 44 may be focused by the condenser lens systems 45 always to fall at the entrance pupil of projection lens 85. In an alternative embodiment of the invention, means (not shown) may be provided to vary the focal length and/or position of the condenser lens system 45 simultaneously with changes in the distance between the plane of the transparency 72 (Fig. 2A) and the entrance pupil and/or principal plane of the projection lens 85 in order to continue to form an image of the illumination source at the entrance pupil at the projection lens. As an alternate arrangement to have the light source focused at the entrance pupil of the projection lens, and in particular if the lens aperture is larger than the film gate, illumination from source 44 may be focused upon the transparency 72 (Fig. 2A), provided a source having a uniform surface brightness such as a carbon arc is used.

By means of the simultaneous operation of motors 40 and 63 from the output of altitude computer 107 (Fig. 4) we are enabled to employ a projection lens 85 having a relatively large aperture, and still obtain sharp focus of projected images for all simulated altitudes. It will be understood by those skilled in the art, however, that motor 63 may be eliminated entirely if the projection lens 85 is of a type having a sufficiently great depth of focus, as may be obtained with a lens having a smaller aperture. The use of a smaller aperture projection lens, however, requires more intense illumination of the transparency in order to obtain projected images of the desired brilliancy. Because of the greater problem of cooling the projector when a high intensity illumination source is employed, we prefer to use a larger aperture lens at 85 and provide means, including motors 40 and 63 operating concurrently, to vary the magnification of projected images in simulation of altitude changes. The optical significance of varying the distance between the image object and the projection lens will be better understood from a study of the schematic drawing of Fig. 3 described hereinafter.

Figure 2A:
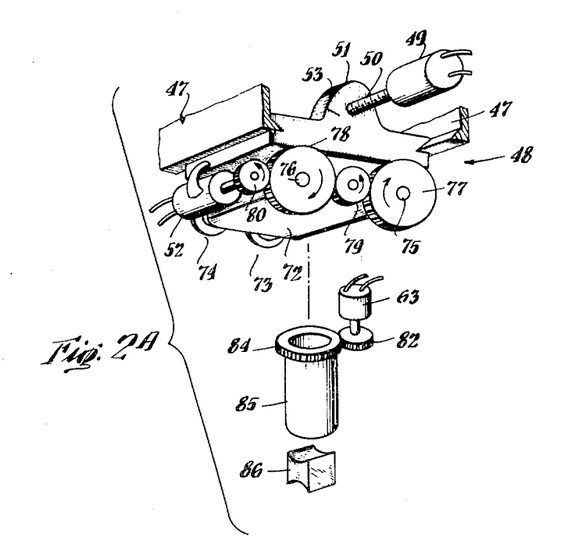
Fig. 2A is a detailed perspective view of the lower portion of the optical projector of Fig. 2, showing the image transparency transport mechanism and the projection lens assembly.

Reference is now had to Fig. 2A of the drawing wherein structural details of the film transport mechanism contained in the compartment 48 (Fig. 2) are disclosed. Slidably mounted between parallel guide members 47—47 is film carriage 53 to which is affixed the longitudinal film transport motor 52. Lateral film transport motor 49 (shown in Fig. 2 affixed to the rotatable cylinder 30) is adapted to drive screw shaft 50 in engagement with screw follower 51 in either direction to impart lateral motion to film carriage 53 with respect to guides 47—47, as described above in reference to Fig. 2. A transparent object 72, which may be in the form of a positive transparency film roll, is supported by spools 73 and 74 affixed to shafts 75 and 76 respectively. Also mounted on shafts 75 and 76 are a pair of spur gears 77 and 78. An idler gear 79, or equivalent coupling mechanism, connects gear 77 with gear 78 in such manner that both spools 73 and 74 are driven in the same direction and at substantially the same rate, whereby transparent film strip 72 may be transported from one spool to the other depending upon the direction of operation of motor 52. It is to be understood that the film winding portion of the transparency transport mechanism in Fig. 2A is representative of only one possible embodiment, and that other types of transparency transport mechanism may be employed, as for example, belt or spring drives which may be desired if a film strip of substantial length is to be wound directly upon spools 73 and 74. In other embodiments of the invention which may employ a rectangular transparency sheet, or a three-dimensional transparency to be described hereinafter in reference to Fig. 6, a longitudinal rack may be engaged by the pinion 80 to move the transparency substantially from left to right as viewed in Fig. 2A of the drawings.

The longitudinal transparency transport servo motor 52 is connected to the output of the pitch and fore-aft position computer (106 Fig. 4) and produces movement of the projected images at right angles to the direction of motion imparted by operation of motor 49. Such motion of the projected images simulates flight motion in a preselected direction over the ground, as for example north-south motion over the ground may be simulated by operation of motor 52 while motor 49 may simulate motion in the east-west direction.

In Fig. 2A, the variable focal length projection lens 85 is shown beneath the film carriage mechanism 48, spaced from the plane of the film transparency 72. Motor 63 driving pinion 82 in engagement with ring gear 84 on the barrel of lens 85 is operated by the output of altitude computer 107 (Fig. 4) as described above in reference to Fig. 2 of the drawings. The anamorphic lens element 86 which is mounted on the optical axis of the projection lens system 85 is fixed with respect to the projector housing (not shown in Fig. 2A) and does not rotate when the lens ring 84 is rotated by pinion 82 to vary focal length and magnification of projection lens system 85, nor does element 86 turn with rotation of the transparency supporting cylinder 30 (Fig. 2) as the heading motor is operated to rotate the object transparency in simulation of heading changes. The function of the anamorphic lens element 86 is to modify the ratio of width to length magnification of images projected by the lens 85 in order to produce realistic simulation of horizontal perspective in images projected onto the screen 20, as will be described more fully hereinafter in reference to Fig. 3.

Figure 3:
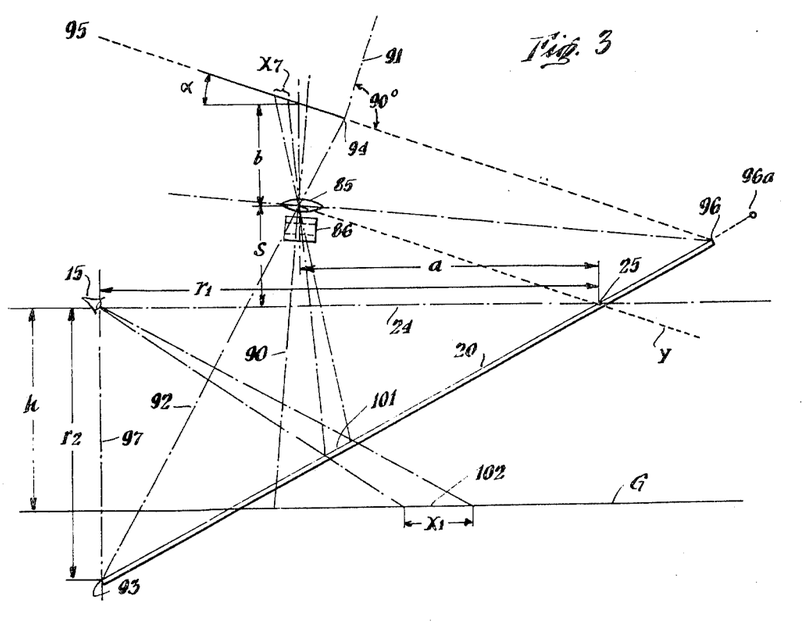
Fig. 3 represents a schematic diagram of the optical system of the invention.

The manner in which the optical system of the projector 27 functions in cooperation with the inclined screen 20 to provide accurate and realistic simulation of perspective may be better understood from a study of Fig. 1 and Fig. 3 of the drawings. It will be appreciated that in order to produce the illusion of horizontal perspective, it is necessary to form an image in which receding parallel lines, as for example the sides of an airport runway, appear to converge in the distance. As is well known, the visual illusion of perspective causes rectangular objects viewed from a position closer to one end than the other to appear not as rectangles, but as trapezoids, the wide base being the portion closest to the point of observation. This phenomenon is referred to as keystone distortion because of the familiar trapezoidal shape of keystones in masonry arches.

One way in which controlled keystone distortion may be provided in a visual training device is by employing a pre-distorted transparency object. Another means of producing the desired keystone distortion is the preferred embodiment disclosed by the drawings, wherein a normal, undistorted photographic transparency is projected at an angle to form an image on an inclined screen in such manner that the lower portion of the formed image, which is closest to the point of observation, is so magnified that it subtends a larger angle at the eye 15 than the upper or more remote portion of the image. This is clearly illustrated in Fig. 1 of the drawings wherein the large trapezoidal image 100 represents a rectangular runway as viewed from an airborne position over one end thereof. The small trapezoidal portion 101 of the image 100 appears to the eye 15 of the trainee exactly as would a rectangular image disposed in a horizontal, or simulated ground plane, as represented at 102 in Fig. 1.

Referring now in greater detail to Fig. 3 of the drawings, the angular and dimensional relationships between a portion of the transparency, $x_7$, the projection lens system 85, the anamorphic lens element 86 and the inclined projection screen 20 will be described as the preferred embodiment of the invention. In Fig. 3, the optical axis of the projection system is represented by the center-line 90 which may be seen to intersect the projection screen 20 at an angle other than normal. The plane of the transparent object of which $x_7$ represents an incremented portion, is represented by the line 95—96 in Fig. 3. In order that all points of the projected image 101 formed by projection of object $x_7$ on the surface of screen 20 be in sharp focus, it is necessary that the plane of the projection lens 85 and the plane of the transparent object $x_7$ intersect the plane of the screen 20 in a common line as represented by the point 96 in Fig. 3. The intersection 96 need not necessarily be on the surface of the physical projection screen, but may be at a remote position beyond the visible end of the screen 20. The location of the intersection 96 as represented in Fig. 3, and the angle at which the plane of the transparency $x_7$ is inclined in the drawing, are merely illustrative of the optical principles involved in the invention, and do not represent a scale drawing of the structure.

In Fig. 3, $\alpha$ represents the angle of the film plane from the horizontal, $x_7$ is the longitudinal dimension of an incremental part of the transparency object, $y_7$ is the lateral dimension (not shown, as the $y$ direction is perpendicular to the plane of the two-dimensional drawing in Fig. 3) of an incremental part of the transparency object, $b$ is the vertical distance between the optical center of the lens 85 and the plane of the transparency designated by $x_7$, $s$ is the vertical distance between the optical center of the lens 85 and the horizon line 24 which is drawn horizontally from the viewpoint 15 to the intersection 25 on the surface of screen 20, $r_1$ is the horizontal distance between the observation point 15 and the horizon point 25 on screen 20, $r_2$ is the vertical distance from the observation point 15 to the projection screen 20, $h$ is the height of the observation point 15 above the simulated ground plane G, $x_1$ is the true longitudinal dimension of the portion 102 of the simulated ground G represented by image 101, and $y_1$ is the true lateral dimension (not shown) of that portion 102 of the simulated ground G which is represented by the image 101.

While projecting images at an angle onto screen 20 produces a keystone distortion, this angular projection also results in an image which appears from viewpoint 15 to be magnified more in the $x$ direction as represented in Fig. 3 than in the $y$ direction. For this reason, the anamorphic lens element 86 is interposed in the optical path of the projection system to correct this inequality of image magnification in the $x$ and $y$ directions. If simulated changes of heading of the cockpit 1 (Fig. 1) are not required, the anamorphic adapter 86 may be eliminated, provided the transparency $x_7$ has the correct $x$ to $y$ direction distortion to compensate for the unequal magnifications in the $x$ and $y$ directions. If the dimensions of the optical system are selected such that the tangent of the angle $\alpha$ between the transparency plane and the horizontal equals $$\frac{s}{a}$$

and if the anamorphic adapter is not used, the longitudinal (i.e. in the "$x$" direction) magnification $M'_x$, the lateral (i.e. in the "$y$" direction) magnification $M'_y$, and the magnification ratio $$\frac{M'_x}{M'_y}$$

may be expressed as:

(1) $\quad M'_x = \frac{x_1}{x_7} = \frac{h}{b}\left[\frac{r_1}{a}(\cos \alpha)\right]\left(1 + \frac{s}{a}\cdot\frac{r_1}{r_2}\right)$ (2) $\quad M'_y = \frac{y_1}{y_7} = \frac{h}{b}\left(1 + \frac{s}{a}\cdot\frac{r_1}{r_2}\right)$ (3) $\quad \frac{M'_x}{M'_y} = \frac{r_1}{a}(\cos \alpha)$ where $y_1$ is the lateral dimension of a simulated ground image having longitudinal dimension $x_1$, and $y_7$ is the lateral dimension of the transparency object whose longitudinal dimension is $x_7$, as shown in Fig. 3. The $y$ or lateral dimensions are perpendicular to the plane of the drawing in Fig. 3. The above relationship holds true only if the plane of the transparent object represented by the incremental portion $x_7$ remains parallel to plane Y which passes through horizon line 25 on the surface of screen 20 (Fig. 1) and the center of the lens 85. This condition assures that the tangent of angle $\alpha$ equals $s/a$.

To permit use of an undistorted transparency, the anamorphic adapter 86 must have a magnification in the $y$ direction which is $$\frac{M'_x}{M'_y}$$

times as great as its magnification in the $x$ direction. With an anamorphic adapter having a magnification in the $y$ direction equal to $$\left[\frac{r_1}{a}\cos \alpha\right]$$

and a magnification in the $x$ direction equal to unity or 1.0, the system magnifications including the anamorphic adapter may be expressed as:

$$M_x = \frac{x_1}{x_7} = \frac{h}{b}\left[\frac{r_1}{a}\cos \alpha\right]\left(1 + \frac{s}{a}\cdot\frac{r_1}{r_2}\right)$$

$$M_y = \frac{y_1}{y_7} = \frac{h}{b}\left[\frac{r_1}{a}\cos \alpha\right]\left(1 + \frac{s}{a}\cdot\frac{r_1}{r_2}\right)$$

$$\frac{M_x}{M_y} = 1.0$$

The above values for the magnification characteristics of the anamorphic adapter 86 are an illustrative example only and are not the only values which might be used. The basic requirement in the anamorphic adapter is the magnification ratio in the $y$ to $x$ direction, and this ratio must always be $$\left[\frac{r_1}{a}\cos \alpha\right]$$

to obtain a ratio $$\frac{M_x}{M_y} = 1.0$$

and to permit use of an undistorted transparency. It is, of course, understood that transparencies will have some unwanted "distortion" because of aberrations in the lenses used to take the picture, film "graininess," etc. but it is not such distortion that is referred to here.

The arrangement and location of parts shown in Fig. 3 are illustrative of the case where the lens 85 and anamorphic adapter 86 can be considered to act in common as a "thin" lens. It will be understood by those skilled in the art that "thick" lenses can be used, and in this latter case it is necessary to consider the principal points of the lens or lens combination rather than a single lens center point of the thin lens.

For correct simulation of changes in flight heading, as accomplished by simulated turning maneuvers, the transparency object 72 supported by the transport mechanism of Fig. 2A is rotated about the axis 91 in Fig. 3 by operation of heading motor 35 as previously described in reference to Fig. 2 and Fig. 2A of the drawings. The manner in which the axis 91 may be located is shown in Fig. 3 by line 92 which is drawn through the intersection 93 of the plane of the screen 20 with a vertical line 97 through the observation point 15, the upper portion of line 92 passing through the optical center of the projection lens 85 and intersecting the plane of the transparency, 95—96, at the point 94. In order that the projected images remain in focus throughout all simulated changes in heading, it is necessary that the transparency object $x_7$ remain in the same plane regardless of angular rotation thereof. Accordingly, the rotational axis 91 is at 90° to the plane 95—96 of the transparency $x_7$ and is offset forwardly in the $x$ direction (toward intersection 96) from the optical axis 90 of the projection lens system 85 as shown in Fig. 3.

Rotation of the object transparency about axis 91 assures that the point 94, in the plane of the transparency which is projected onto screen 20 at point 93, directly below the viewpoint 15, remains stationary while the remainder of the image revolves in simulation of aircraft turning motion. In this way, realistic simulation of changes in heading are achieved as the images projected onto screen 20 are rotated about the point 93 immediately below the cockpit of the simulated aircraft. Of course, if the simulated maneuver is not a simple change in heading, but also includes simulated lateral and/or longitudinal motion, then appropriate lateral and/or longitudinal motions will also be imparted to the transparency 72 by operation of motors 49 and/or 52 as described above in reference to Fig. 2A.

When changes in flight altitude are simulated, the transparency 72 is moved so that all points on the transparency travel in a direction parallel to axis 92 in Fig. 3, thereby maintaining the plane of the transparency at all times parallel to the plane Y, and assuring that the tangent of angle $\alpha$ remains equal to $s/a$. This also assures that the projection of point 94 in the plane of the transparency continues to fall at point 93 on the screen 20 for all positions to which the plane of the transparency may be shifted in simulation of altitude changes. The embodiment of the invention disclosed by Fig. 2 of the drawings provides means, including tiltable lens board 65 and slide mechanism 506, for changing the angle of the plane of lens 85 simultaneously with changes in elevation of the film carriage 48, as described above in reference to Fig. 2. Another embodiment of the invention, disclosed by Fig. 5 to be described in detail hereinafter, provides means wherein the angle of the projection lens 85 may remain unchanged but wherein the axis 91 is shifted laterally as the film plane is raised or lowered to simulate changes in flight altitude. Either of these motions is effective to maintain the projected image of point 94 of the transparency at point 93 on screen 20, as the image magnification is varied in simulation of altitude changes.

Figure 4:
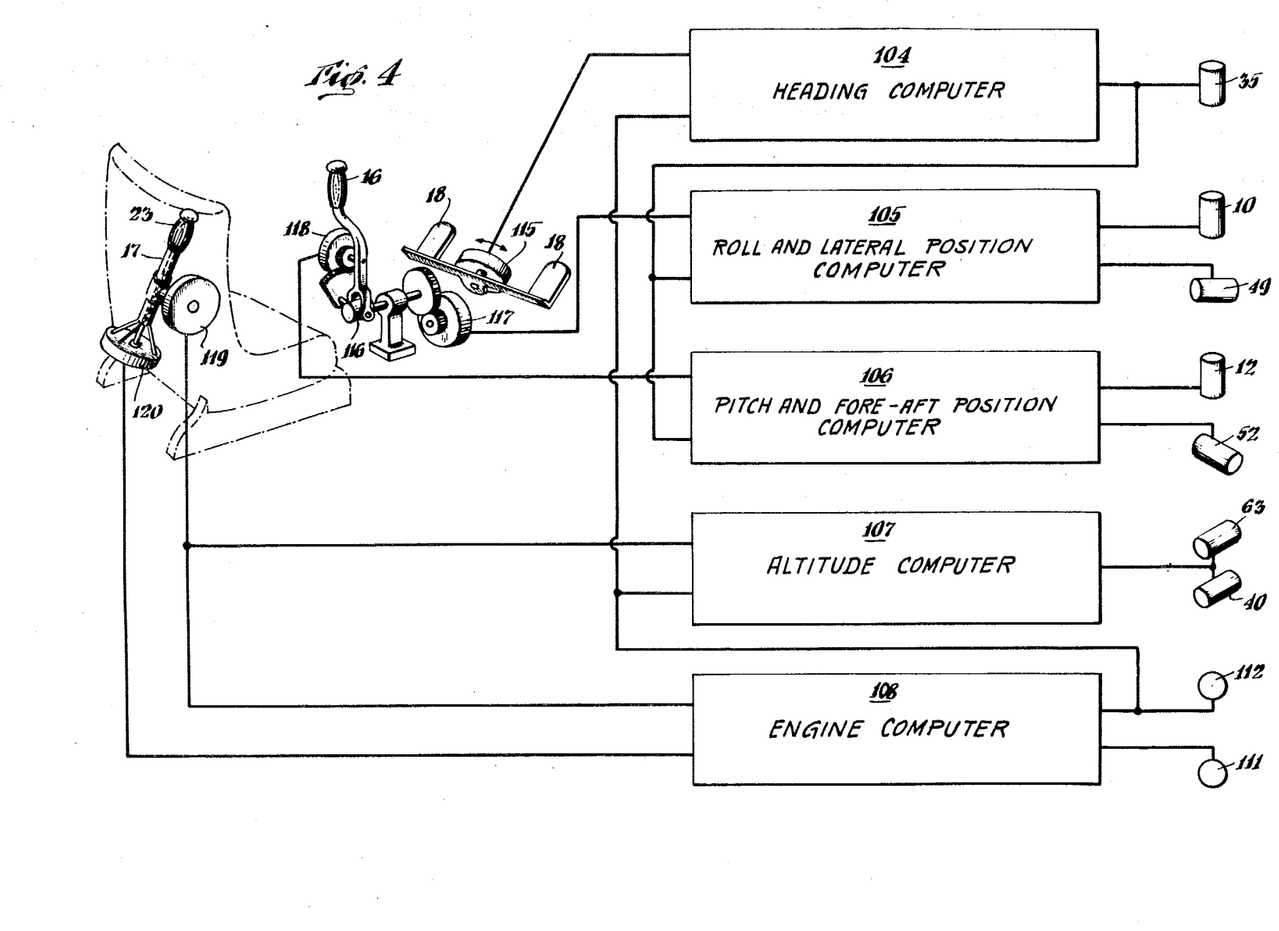
Fig. 4 is a schematic diagram of interconnections between the controls, computers and mechanical structures of the invention.

Reference is now had to Fig. 4 of the drawings which represents a schematic diagram of interconnections between the simulated flight controls in the cockpit, several of the flight function computers, and the servo motors and other operating mechanisms disclosed in Fig. 1, Fig. 2 and Fig. 2A of the drawings. The heading servo 35 is shown connected to the output of the heading computer 104, which computer may comprise the combination of circuit elements disclosed in the aforesaid copending application of Harold S. Hemstreet. The roll servo 10 and the lateral film transport servo 49 are connected to the output of roll and lateral position computer 105, the pitch servo 12 and longitudinal film transport servo 52 are connected to the output of pitch and fore-aft position computer 106, the projection lens servo 63 and film elevation servo 40 are connected to the output of altitude computer 107, while a manifold pressure gauge 111 and an engine r.p.m. indicator 112 are connected with the output of the engine computer 108. The simulator flight and engine computers 104, 105, 106, 107 and 108 may be the corresponding computers disclosed in the aforesaid copending application of Harold S. Hemstreet, or other suitable circuits for computing these functions may be employed.

The controls provided at the trainee's station may comprise, for example, the rudder pedals 18—18 by which a steering potentiometer 115 may be rotated in either direction to derive appropriate input voltages representing pedal deflection to be applied to the heading computer 104. The cyclic pitch control 16, mounted for universal motion about the universal joint 116 rotates potentiometer 117 when the control stick 16 is moved laterally either to the right or left, to derive input signals for the roll and lateral position computer 105. When the cyclic pitch control 16 is moved fore or aft about the universal joint 116, potentiometer 118 is rotated thereby to derive input signals for the pitch and fore-aft position computer 106.

The collective pitch control 17 when moved up or down rotates potentiometer 119 to derive a collective pitch potential which is applied to the inputs of computers 107 and 108 as shown. When the handle grip 23 of the collective pitch control is rotated, it operates a rod extending through the hollow shaft 17 (as represented by dotted lines in Fig. 4) to rotate the shaft of throttle potentiometer 120 to derive a potential which is applied to the input of engine computer 108 as shown. By means of the connections shown in the schematic drawing of Fig. 4, the operation of a rotary wing aircraft, or helicopter, may be simulated. It is to be understood, however, that the invention may be employed to simulate contact flight maneuvers of fixed wing types of aircraft, for which somewhat different operator controls may be provided and different flight and engine computers may be employed.

Figure 5:
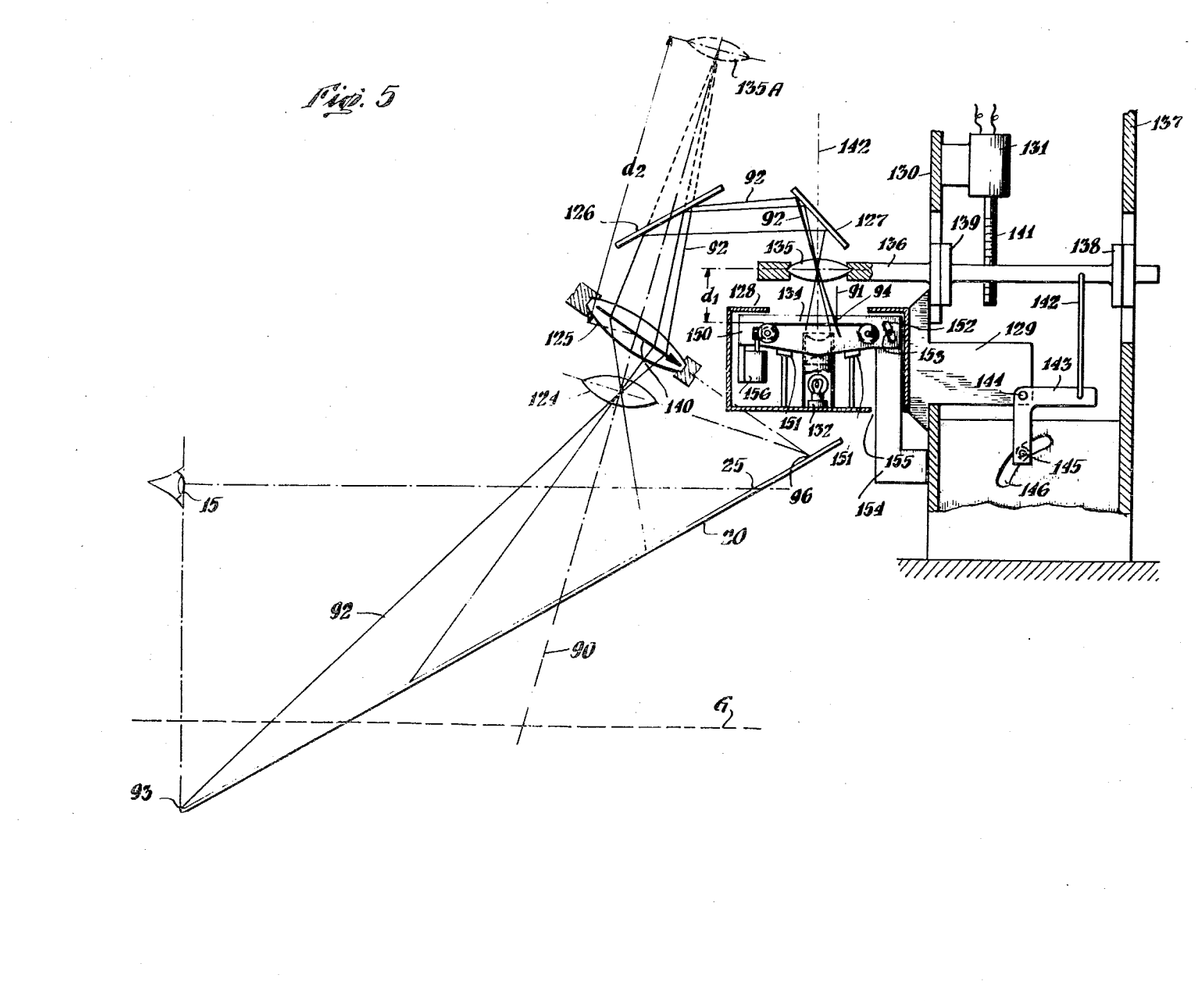
Fig. 5 is a schematic representation of an alternative embodiment of the invention, showing another optical system which may be employed in lieu of the optical projector illustrated by Fig. 2 and Fig. 2A of the drawings.

Reference is now had to Fig. 5 of the drawings wherein an alternative embodiment of the invention is disclosed in which variable magnification of projected images to simulate changes in altitude may be achieved without the use of a variable focal length projection lens. In the schematic drawing of Fig. 5 the trainee's viewpoint is represented by the eye 15, which is located directly above the point 93 on the lower surface of inclined screen 20. The intersection of the line 15—25 with the surface of screen 20 represents the simulated horizon line as viewed by the trainee, and the horizontal line G represents the simulated ground plane. A fixed focus projection lens 124 is supported (by means not shown) a fixed distance above the screen 20, and the optical axis 90 of lens 124 is inclined at an angle other than normal to the projection screen 20. Above the projection lens 124 is fixed a larger field lens 125 adapted to redirect light rays from the remainder of the optical system into the projection lens 124. To conserve vertical space in the embodiment of Fig. 5, the optical path of light rays is folded by means of reflectors 126 and 127 which may be front surfaced plane mirrors.

The film transparency support and illumination means of Fig. 5 are contained in horizontally disposed housing 128 which is rigidly affixed to vertically movable member 129. Member 129 is slidably mounted in a vertical slot of guide plate 130, and is adapted to be raised or lowered by operation of altitude motor 131, as will be described more fully hereinafter. A projection lamp or arc 132 and associated condenser lens system is mounted within the housing 128, beneath the horizontally disposed film transparency 134. Above the transparency 134 is an image forming lens 135 which is supported by vertically movable horizontal arm 136. Arm 136 is slidably mounted in vertical slots through the upright guide members 130 and 137, being guided therebetween by bearing blocks 138 and 139 which bear upon the inner faces of uprights 130 and 137.

The lens 135 forms an intermediate image of the transparency 134 in or near the field lens 125, as represented by the image arrow 140. The intermediate image 140 must be formed in a plane which passes through the line (represented by 96 in Fig. 5) which is the intersection of the plane of lens 124 and the plane of screen 20. This assures that the image on screen 20 will be in focus all over the screen when lens 124 is operated with the large aperture necessary for adequate illumination of the screen. The intermediate image 140 will be formed in the desired plane described above if the plane of image 140 and the plane of transparency or object 134 intersect in a line which lies in the plane of lens 135, with due consideration being given the fact that the system as shown has been "folded" twice by plane reflectors 126 and 127. To determine the proper inclination of the plane of transparency 134 with respect to the system axis 142 the entire system may be laid out in a straight line along axis 90, as indicated by the location of lens 135A shown in broken lines. It is to be understood that the plane of the field lens 125 need not necessarily coincide with the plane of the image 140. The field lens 125 merely serves to redirect the light of the image through the projection lens 124 whereby a final magnified image is formed on the surface of screen 20.

In order to simulate changes in altitude, the intermediate image 140 must be changed in size, this image 140 becoming larger as simulated altitude decreases or smaller as simulated altitude is increased. The change in size of the intermediate image 140 is accomplished by moving the entire primary projection apparatus comprising the image forming lens 135, the transparency 134, and the illumination source 132 with its associated condensing lens system. For purposes of identification the movable lens 135 may be referred to as the primary projection lens, while the fixed lens 124 will be referred to as the secondary projection lens.

The altitude motor 131 is connected to the output of an altitude computer in the same manner that altitude motors 40 and 63 of Fig. 2 are shown connected to computer 107 in Fig. 4. Reversible motor 131 drives screw shaft 141 which engages a screw follower (not shown) in arm 136, whereby arm 136 is raised or lowered depending upon the direction of rotation of shaft 141. Arm 136 is guided vertically by slots in upright members 130 and 137, and is prevented from moving laterally by bearing blocks 138 and 139. As arm 136 moves up or down, primary projection lens 135 carried thereby is moved vertically along its optical axis 142, thus varying the optical distance between the principal plane of primary lens 135 and the center of field lens 125. In Fig. 5 this distance between lenses 135 and 125 is designated as $d_2$, the representation of a lens 135A in broken lines indicating the position which lens 135 would occupy if it were axially aligned with field lens 125. Variations in the distance $d_2$ by movement of lens 135 produce changes in the size of intermediate image 140, corresponding to simulated changes in altitude.

In order that the intermediate image 140 continue to be formed in the same plane, as its size is varied by movement of lens 135, it is necessary to alter the distance from the primary projection lens 135 to the surface of transparency 134. This distance, designated $d_1$ in Fig. 5, must be altered simultaneously with changes in the distance $d_2$, although the variations of $d_1$ should normally be less than, and in opposite direction to, the corresponding variations of $d_2$. The relationship of $d_1$ to $d_2$ is determined by the focal length of lens 135, and may be expressed as:

$$\frac{1}{d_1} = \frac{1}{f} - \frac{1}{d_2}$$

where $f$ is the focal length of lens 135.

The required variation of $d_1$ is obtained by means of link 142 which couples arm 136 with bellcrank lever 143. The lever 143 is pivoted at 144 to member 129. The lower end of lever 143 carries a pin 145 which is slidably engaged with fixed cam slot 146. As arm 136 is moved upwardly by screw 141 to decrease the distance $d_2$, link 142 and lever 143 also move upward and raise the member 129 which carries the housing 128, the illumination source 132 and the film transparency 134. Pin 145 following cam 146 causes the member 129 to move at a slower rate, hence through a lesser distance, than the motion of arm 136. In this manner, as the distance $d_2$ is decreased by upward movement of the lens 135, distance $d_1$ is slightly increased to maintain the relation $$\frac{1}{d_1} = \frac{1}{f} - \frac{1}{d_2}$$

whereby the intermediate image 140 is retained in the same plane while the size of image 140 is reduced through the lesser magnification effected by the changes in $d_1$ and $d_2$. If the arm 136 is moved downwardly by reverse rotation of screw 141, increasing the dimension $d_2$, then the dimension $d_1$ decreases in a similar fashion and the size of intermediate image 140 increases within its established plane.

The film transparency 134 is supported within housing 128 by carriage 150 which is slidably supported on substantially horizontal curved guides 151—151 affixed to the housing 128. The curved guides 151—151 act as a cam to maintain the common line of intersection of the plane of transparency 134, plane of lens 135 and plane of image 140 as previously shown is necessary to maintain focus. An inclined cam slot 152 in carriage member 150 is engaged by fixed pin 153 on vertical arm 154 which is rigidly affixed to the lower portion of upright member 130. Arm 154 passes through an opening 155 in the bottom of housing 128 whereby the entire housing 128 and all parts contained therein are free to move up or down with respect to arm 154 as vertical motion is imparted to member 129 by operation of motor 131. As member 150 is raised by upward movement of housing 128, cam groove 152 moves with respect to fixed pin 153, causing carriage 150 to slide laterally over guides 151, from right to left as viewed in Fig. 5. Conversely, as carriage 150 is moved downwardly, cam 152 drives carriage 150 from left to right. The reasons for providing this lateral translation of carriage 150 through operation of cam 152 will be more fully explained hereinafter. It is to be understood that in addition to, and wholly independent of, the lateral motion imparted to carriage 150 by cam 152, the film transparency 134 is adapted to be moved in two dimensional lateral translation by means (not shown here for sake of clarity) such as the longitudinal and lateral translation motors 49 and 52, respectively, as described in reference to Fig. 2A above.

As illustrated in Fig. 5, a reversible heading motor 156 is mounted on horizontal carriage 150. Motor 156 is connected with the output of a heading computer, such as computer 104 in Fig. 4, and operates to rotate the transparency 134 of Fig. 5 about an axis 91 to simulate changes in aircraft heading, in substantially the same manner that motor 35 functions in the structure of Fig. 2 described above. The axis 91, in Fig. 5, is located in the same manner as was explained above for location of heading rotation axis in reference to the schematic diagram of Fig. 3. Axis 91 is perpendicular to the plane of transparency 134 and is found by tracing ray 92 from point 93 back through the optical system of lenses 124, 125 and 135 to the surface of transparency 134. Cam groove 152 in member 150 follows a straight line and, in particular, is parallel to that portion of ray 92 which passes through the center of primary projection lens 135. Hence it may be seen that as film carriage 150 is moved vertically by member 129 and laterally by cam 152, the axis of film rotation 91 is also shifted laterally in such manner that the point 94, about which the transparency is rotated, always follows ray 92, and the magnified image of point 94 is always projected onto screen 20 at point 93, directly below the viewpoint 15. In this manner, the structure of Fig. 5 assures that changes in image magnification effected by operation of altitude motor 131 simulate changes of altitude only, while image rotation effected by operation of heading motor 156 simulates only heading changes about a vertical axis through viewpoint 15.

Whereas heading changes about a vertical axis through viewpoint 15 have previously been described, this is only illustrative. If desired the axis of simulated heading changes may be located elsewhere, along the simulated helicopter rotor axis, for example, by appropriate location of axis 91.

As is also true of the embodiment disclosed by Fig. 2 and Fig. 2A, the structure of Fig. 5 provides means for accurate visual simulation of changes in altitude, heading and lateral position, and the image motions simulating all of these factors are wholly independent of each other. The embodiment of the invention disclosed by Fig. 5 offers the advantage that a variable focal length projection lens is not required, and it is not necessary to change the mounting angle of projection lens 124 as image magnification is varied in simulation of altitude changes. Although not shown separately in Fig. 5, it is to be understood that secondary projection lens 124 includes an anamorphic adapter element as disclosed by element 86 in Fig. 2A and Fig. 3 of the drawings.

While Fig. 5 shows the film 134 being reimaged once at 140 this is only illustrative and the image 140 could be reimaged any number of times by additional objective lenses and field lenses before being imaged on the screen.

Figure 6:
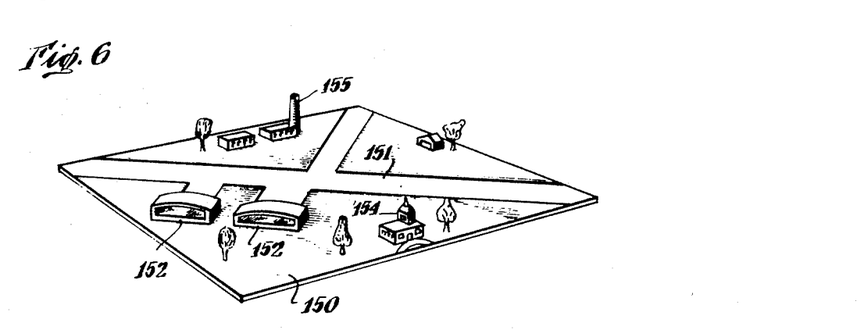
Fig. 6 is a perspective view of an alternative form of object transparency which may be employed in the invention.

It is to be understood that only a portion of the image on transparencies 72 (Fig. 2A), 134 (Fig. 5) or the three dimensional transparency of Fig. 6, is projected onto the inclined screen (20, Fig. 1, Fig. 3 and Fig. 5) at any instant. A sufficiently wide angle projection lens is employed in the optical system (85 of Fig. 3 or 124 of Fig. 5) so that the portion of the transparency image which is projected, is so magnified as to substantially fill the projection screen 20. As the transparency carriage mechanism is rotated by operation of the heading motor (35, Fig. 2, or 156, Fig. 5), the projected portion of the image transparency rotates about point 93 on screen 20 (Fig. 3 and Fig. 5) in simulation of heading changes, and as the transparency carriage is moved in translation by operation of servo motors 49 or 52 (Fig. 2A), the image projected onto the screen 20 shifts accordingly in simulation of translatory flight motions. Operation of the altitude servo motors (40 and 63, Fig. 2—131, Fig. 5) varies the area of terrain projected, and the magnification of the projection lens system (85, Fig. 3—124 and 135, Fig. 5) so that either greater or lesser areas of transparency are projected, and as the area covered decreases, the magnification thereof increases to project an image which continues substantially to fill the visible portions of the projection screen 20.

Although experience has demonstrated that sufficient information may be imparted visually to student pilots merely by their perception of ground objects in a horizontal plane, which they may perceive in proper horizontal perspective by means of the structures disclosed in Fig. 1, Fig. 2, Fig. 3, Fig. 4 and Fig. 5 of the drawings, and by the method of visual simulation herein described in reference thereto, it is possible in the practice of the invention to add a third visual dimension, namely the factor of vertical perspective, by employing a three dimensional transparent object in lieu of a simple two dimensional transparent film. Fig. 6 of the drawings illustrates one form of three dimensional transparency which may be employed if desired.

In the embodiment of Fig. 6, the transparency which is placed in the object plane of the projector comprises a thin transparent base 150, which may be either of glass, plastic, or film, upon which small three dimensional models of ground objects are mounted. Thus Fig. 6 of the drawings represents such a transparent model of an airfield having a runway 151, a pair of hangars 152—152, an administration building and control tower 154, a silo or grain elevator 155, and various other models of buildings and trees as shown.

When such a model as represented in Fig. 6 is placed in the projector of Fig. 1, and uniformly illuminated by light rays from the condenser illumination system, an image will be projected onto the screen 20 which will embody not only the correct simulation of horizontal perspective, as previously described, but also will include shadowgraph features conveying a sense of a third dimension, or vertical perspective corresponding to the relative heights and shapes of the three dimensional transparent models. A further requirement on the optical system when a solid model is used is that the system must be arranged so that axis 92 (Fig. 3) is normal to that part of the model which represents the horizontal ground. If this condition is not maintained the buildings in the picture will appear to be leaning away from the vertical. Because of the greater thickness and irregular surface contours of three dimensional models as represented in Fig. 6, it is generally not feasible to utilize a long film strip to be wound on film spools by a mechanism such as that disclosed in Fig. 2A of the drawings. However, such solid transparencies may be mounted on a transparent plane platen having a gear rack engageable with the pinion 80 of Fig. 2A to impart longitudinal or fore and aft motion to the transparency, and other means as shown in Fig. 2A to impart lateral motion.

While the use of a three dimensional transparency as represented by Fig. 6 is not necessary to impart realistic simulation of actual flight, such three dimensional transparencies may be used for simulating the maneuvers of hovering at a low altitude in a helicopter.

Figure 7:
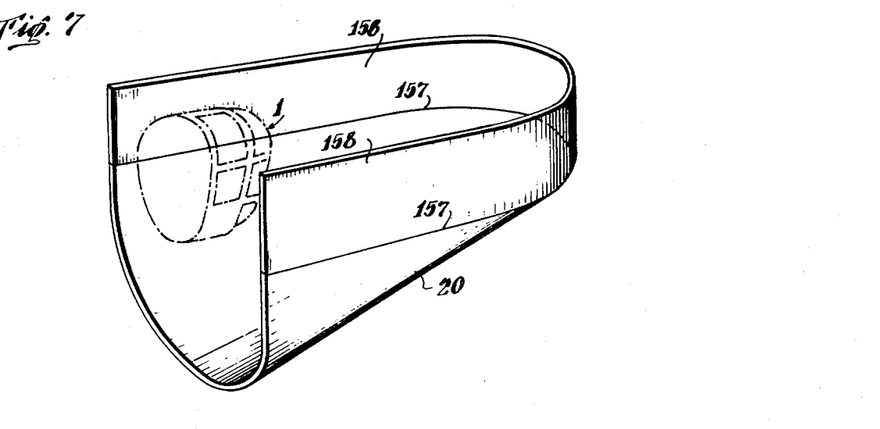
Fig. 7 is a perspective view of a curved projection screen which may be employed in the invention, with a trainee's station shown in broken lines.
Figure 8:
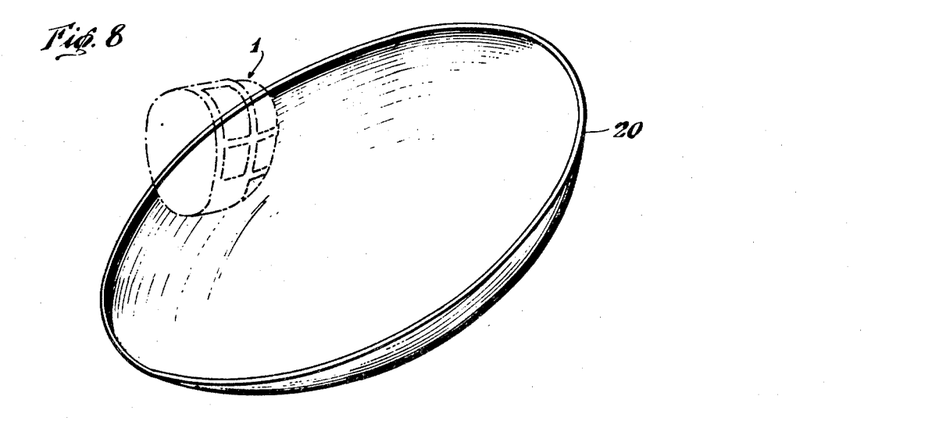
Fig. 8 represents an alternative form of curved projection screen which may be employed in the practice of the invention.

Although a plane surface inclined screen is disclosed in the preferred embodiments of Fig. 1, Fig. 3, and Fig. 5, it is to be understood that the invention is not limited to projection on plane screens, but that if some inaccuracies in the visual illusion are permissible, and if the projection lens (85, Fig. 3—124, Fig. 5) has sufficient depth of focus, the method of visual simulation embodied in the invention may be practiced with curved screens, of which several possible forms are disclosed by Fig. 7 and Fig. 8 of the drawings. The degree of distortion or inaccuracy when employing curved screens tends to be minimized by location of the projector close to the student's viewpoint, as if the projector is mounted directly over the cockpit. In Fig. 7, the projection screen 20 is represented as comprising a cylindrical section, the axis of which is inclined upwardly at an angle corresponding to the angle of inclination of the plane screen represented in Fig. 1. The angle at which the projection screen 20 may be inclined in all embodiments of the invention is not critical, but is preferably between 10° and 45° from the horizontal. In Fig. 7, the curved line 157—157 represents, in perspective view, a parabola formed by the intersection of a horizontal plane passing through the inclined cylindrical screen 20. This line 157—157 corresponds to the horizon line 25 in Fig. 1 of the drawings.

In Fig. 7, the projection screen structure is shown extending vertically above the horizon line 157—157 to represent a panorama of sky background visible from the trainee's station 1, above the images of ground terrain projected onto screen 20. It is to be understood that a separate background projector may be provided if desired to project a representation of sky and/or clouds onto the upper portion of the screen 158—158 in Fig. 7. It is within the contemplation of the invention that such background projector (not shown) may be adapted to project moving images of clouds corresponding to clouds viewed from a moving aircraft.

The alternative form of curved projection screen disclosed in Fig. 8 of the drawings represents a spherical section. It is to be understood, of course, that the curved screen which may be used in the practice of the invention, whether it be spherical, parabolic or cylindrical in form, may extend as high as desired, and may indeed completely enclose the trainee's cockpit 1. Irregularly curved, or warped surface screens may also be employed.

It will be appreciated that photographic color-positive film transparencies may be employed in the optical projector of the invention, and that such transparencies may either comprise aerial photographs of actual terrain over which a simulated flight is to be made, or may comprise photographs or drawings of symbolic scenes such as a runway with lengthwise and crosswise painted lines, or the transparencies may comprise photographs of terrain models, as for example topograhic models of enemy-held terrain.

In the practice of the invention, aerial type photographic roll film may be employed as the transparency medium, and such transparencies may be prepared by printing a mosaic strip of successive aerial photographs onto a positive film roll, in the manner commonly employed in making aerial photographic maps. For this purpose, the aerial photographs to be employed in any strip should all preferably be taken from the same constant altitude, and the photographs should all be taken vertically downward, not on a slant angle to the ground plane. The altitude from which such photographs may be made is largely a matter of choice, depending upon the focal length of camera lens, the area to be covered in each photograph, the lateral distance which it is desired to include in the finished film strip, the amount of surface detail which is desired, and of course the limitations of weather and atmospheric conditions.

With a transparency film strip prepared as described above, it is possible by the present invention to simulate a complete flight from take-off through climb to a designated cruising altitude, and let down to landing at a distant air field. If the simulated aircraft has a sufficiently short turning radius, or if the film transparency has been photographed at a sufficiently high altitude to encompass as much terrain in the lateral direction as may be required for a 360° turn of the aircraft, it is possible with the trainer of the invention to simulate a complete turn-around after "flying" the trainer to one end of the film strip. In this way, a return flight may be simulated over the same route and a simulated landing may be made at the original point of take-off.

It is to be understood that the heading servos 35 (Fig. 2) and 156 (Fig. 5) may also be coupled to a simulated compass indicator (not shown) in the cockpit 1, the altitude servos 40 and 63 (Fig. 2), or 131 (Fig. 5) may be coupled to a simulated altimeter (not shown) in the cockpit 1, and the roll and pitch servos 10 and 12 respectively may be coupled to a simulated gyro horizon indicator (not shown) within the cockpit 1. If the rolling and pitching motions are imparted directly to the trainee's station as illustrated by Fig. 1 of the drawings, an actual aircraft gyro horizon indicator may be installed within the cockpit 1.

It will be understood, however, that the trainee's station represented by the cockpit 1 may remain stationary and simulated rolling and pitching motions may be imparted to the projector 27 and screen 20. For most accurate simulation of roll and pitch wherein the trainee's cockpit remains stationary, the projector 27 and the screen 20 should preferably be rotated about a point approximately coinciding with the viewpoint 15 of the trainee seated within the cockpit 1. However, the structural embodiment disclosed by Fig. 1 of the drawings is considered preferable because of the added realism in simulation of actual flight which results from imparting roll and pitch motions to the cockpit, and also because rough air simulation may be introduced into the roll and pitch mechanisms 10 and 12 if desired. Effective means for simulating rough air are disclosed by the copending application of Robert L. Smith and Raymond E. Kittredge, Serial No. 260,388, filed December 7, 1951, now Patent 2,787,842 and assigned to the same assignee as the present application.

Although front projection onto an opaque reflecting screen is considered preferable, as illustrated by Fig. 1 of the drawings, it is to be understood that rear projection onto a translucent screen is within the scope of the invention and may be accomplished by placing the projector in a position beneath a translucent projection screen, as represented generally by the structure 160, shown in broken lines in Fig. 1. This structural arrangement for rear projection has the advantage of completely removing the projection system from the possible view of a student, thereby adding further realism to the illusion of flight created by the projected images.

It will thus be seen that the objects set forth above, among those made apparent from the preceding description, are efficiently attained. Since certain changes may be made in carrying out the above method and in the constructions set forth without departing from the scope of the invention, it is intended that all matter contained in the above description or shown in the accompanying drawings shall be interpreted as illustrative and not in a limiting sense.

We claim:

1. In a grounded flight trainer, a simulated flight control at a trainee's station, a plane object which is an undistorted facsimile to a reduced scale of a plane area the undistorted appearance of which is to be simulated for observation from said trainee's station, a projection lens horizontally displaced from said trainee's station, means for illuminating said object and directing the resultant illumination from said object into said projection lens, a projection screen disposed at an angle with respect to said simulated plane area to receive said illumination, means locating said plane object parallel to a plane passing through said projection lens and a horizontal line in the plane of said screen which line is the intersection with the plane of said screen of a second plane passing through a viewpoint at said trainee's station and parallel to the simulated plane area, said projection lens being characterized by a difference of angular magnifications in two mutually perpendicular planes as measured at said projection lens, said magnification difference being equal to the ratio of the distance from said lens to said intersection line in the plane of the screen and the distance from said viewpoint to said intersection line, driving means for moving said plane object with respect to at least one of the axes thereof, and means connecting said driving means with said simulated flight control whereby said object may be moved in accordance with simulated flight motion of said trainer in a predetermined direction.

2. In a grounded flight trainer, a simulated flight control at a trainee's station, a plane object which is an undistorted facsimile to a reduced scale of a plane area the undistorted appearance of which is to be simulated for observation from said trainee's station, a projection lens horizontally displaced from said trainee's station, means for illuminating said object and directing the resultant illumination from said object into said projection lens, a projection screen disposed at an angle with respect to said simulated plane area to receive said illumination, means locating said plane object parallel to a plane passing through said projection lens and a horizontal line in the plane of said screen which line is the intersection with the plane of said screen of a second plane passing through a viewpoint at said trainee's station and parallel to the simulated plane area, said projection lens being characterized by a difference of angular magnifications in two mutually perpendicular planes as measured at said projection lens, said magnification difference being equal to the ratio of the distance from said lens to said intersection line in the plane of the screen and the distance from said viewpoint to said intersection line, driving means for moving said plane object with respect to the lateral and longitudinal axes thereof, and means connecting said flight control with said driving means to cause motion of projected images from said projector corresponding to simulated flight motion of said trainer.

3. In a grounded flight trainer, simulated flight controls at a trainee's station, a plane object which is an undistorted facsimile to a reduced scale of a plane area the undistorted appearance of which is to be simulated for observation from said trainee's station, a projection lens horizontally displaced from said trainee's station, means for illuminating said object and directing the resultant illumination from said object into said projection lens, a projection screen disposed at an angle with respect to said simulated plane area to receive said illumination, means locating said plane object parallel to a plane passing through said projection lens and a horizontal line in the plane of said screen which line is the intersection with the plane of said screen of a second plane passing through a viewpoint at said trainee's station and parallel to the simulated plane area, said projection lens being characterized by a difference of angular magnifications in two mutually perpendicular planes as measured at said projection lens, said magnification difference being equal to the ratio of the distance from said lens to said intersection line in the plane of the screen and the distance from said viewpoint to said intersection line, first driving means for imparting turning motion to said plane object about a rotational axis, further driving means for imparting lateral motion to said plane object along axes normal to said rotational axis, and means connecting all of said driving means with said simulated flight controls whereby said image plane object may be moved in accordance with simulated flight motion of said trainer.

4. The combination of claim 3 including means for imparting vertical motion to said plane object, and means connecting said vertical motion means with said simulated flight controls whereby said plane object may be moved in response to simulated changes in altitude of said trainer.

5. In a flight simulating apparatus comprising a student's station having controls simulating the controls of an aircraft, the combination of a projection screen lying in a first plane extending forwardly of said student's station at an acute angle to the horizontal, an image projector having a projection lens system the principal plane of which is disposed in a second plane inclined at an angle to said first plane, means for supporting an image transparency within said projector in a third plane intersecting said first and second planes in a line common to all three planes, and means for moving said transparency supporting means within said third plane in response to movement of said controls to bring different areas of a transparency supported therein within the field of said projector lens system, whereby an image projected onto said screen is maintained substantially in focus over said field during simulated aircraft movement.

6. In a flight simulating apparatus comprising a student's station having controls simulating the controls of an aircraft, the combination of a projection screen at least a portion of which lies in a first plane forward of said student's station, said first plane inclined at an acute angle to the horizontal ground plane, an image projector having an optical lens disposed in a second plane inclined at an angle to the portion of said screen in said first plane, means for supporting an image transparency within said projector in a third plane which intersects said first and second planes in a line common to all three planes, and means for moving said transparency supporting means within said third plane in response to movement of said controls to vary the portion of a transparency image cast upon said screen by said projector lens while maintaining the image substantially in focus during motion of the transparency.

7. In a flight simulating apparatus comprising a student's station having controls simulating the controls of an aircraft, the combination of a projection screen extending in a first plane forward of said student's station, an image projector having an optical lens the optical center of which is disposed in a second plane inclined at an angle to the plane of said screen, means for supporting an image transparency within said projector in a third plane which intersects said first and second planes in a line common to all three planes, and means for moving said transparency supporting means within said third plane in response to movement of said controls to vary the portion of a transparency image cast upon said screen by said projector lens while maintaining substantially uniform focus.

8. The combination of claim 7 including an anamorphic optical lens in said projector to alter the ratio of length to width image magnification, whereby the appearance of true horizontal perspective may be imparted to images projected onto said screen.

9. The combination of claim 7 including means connected with said optical projector lens for varying the effective magnification thereof to alter the size of images projected onto said screen.

10. The combination of claim 9 including an altitude computer connected with said variable magnification means and responsive to said controls to vary the size of projected images in simulation of changes in computed flight altitude.

11. The combination of claim 7 including means responsive to said controls for imparting rolling and pitching motions to said projected image relative to said student's station.

12. The combination of claim 11 characterized by means for imparting rolling and pitching motions to said student's station.

13. The combination of claim 11 characterized by means for imparting rolling and pitching motions to said optical projector.

14. The combination of claim 11 characterized by means for imparting rolling and pitching motions to said screen.

15. In a flight simulating apparatus comprising a student's station having controls simulating the controls of an aircraft, the combination of a concave projection screen inclined forwardly of said student's station and extending at least partly beneath said station and on either side thereof, a central portion of said concave screen tangent to a first plane inclined at an angle to the horizontal, an image projector having an optical lens positioned a substantial distance from said screen on the concave side thereof, the optical center of said lens disposed in a second plane inclined at an angle to said first plane, means for supporting an image transparency within said projector in a third plane which intersects said first and second planes in a line common to all three planes, and means for moving said transparency supporting means within said third plane in response to movement of said controls to vary the portion of a transparency image cast upon said screen by said projector lens while maintaining substantially uniform focus over said portion of the image.

16. The combination of claim 15 in which said concave screen comprises a cylindrical section.

17. The combination of claim 15 characterized by a parabolic concave screen.

18. The combination of claim 15 in which said screen comprises a spherical section.

19. Flight simulating apparatus comprising a student's station having controls simulating the controls of an aircraft, a plane object which is an undistorted facsimile to a reduced scale of a plane area the undistorted appearance of which is to be simulated for observation from said student's station, a projection lens horizontally displaced from said student's station, means for illuminating said object and directing the resultant illumination from said object into said projection lens, a projection screen disposed at an angle with respect to said simulated plane area to receive said illumination, means locating said plane object parallel to a plane passing through said projection lens and a horizontal line in the plane of said screen which line is the intersection with the plane of said screen of a second plane passing through a viewpoint at said student's station and parallel to the simulated plane area, said projection lens being characterized by a difference of angular magnifications in two mutually perpendicular planes as measured at said projection lens, said magnification difference being equal to the ratio of the distance from said lens to said intersection line in the plane of the screen and the distance from said viewpoint to said intersection line, driving means for moving said plane object with respect to the longitudinal and lateral axes thereof, and means coupling said driving means with the controls at said student's station whereby said driving means are operated according to simulated aircraft movement, to simulate the illusion of perspective in images as viewed from said student's station.

20. Flight simulating apparatus comprising a student's station having controls corresponding to the controls of an aircraft, a plane object which is an undistorted facsimile to a reduced scale of a plane area the undistorted appearance of which is to be simulated for observation from said student's station, a projection lens horizontally displaced from said student's station, means for illuminating said object and directing the resultant illumination from said object into said projection lens, a projection screen disposed at an angle with respect to said simulated plane area to receive said illumination, means locating said plane object parallel to a plane passing through said projection lens and a horizontal line in the plane of said screen which line is the intersection with the plane of said screen of a second plane passing through a viewpoint at said student's station and parallel to the simulated plane area, said projection lens being characterized by a difference of angular magnifications in two mutually perpendicular planes as measured at said projection lens, said magnification difference being equal to the ratio of the distance from said lens to said intersection line in the plane of the screen and the distance from said viewpoint to said intersection line, means for varying the image magnification of said optical system in accordance with simulated changes in altitude, driving means for moving said plane object in longitudinal and lateral directions with respect to the optical center thereof, means coupling said driving means with the controls at said student's station whereby said driving means are operated in accordance with simulated aircraft flight movements, and means responsive to said controls for imparting rolling and pitching motions to said student's station relative to said screen.

21. Flight simulating apparatus comprising a student's station having controls simulating the controls of an aircraft, a plane object which is an undistorted facsimile to a reduced scale of a plane area the undistorted appearance of which is to be simulated for observation from said student's station, a projection lens horizontally displaced from said student's station, means for illuminating said object and directing the resultant illumination from said object into said projection lens, a projection screen disposed at an angle with respect to said simulated plane area to receive said illumination, means locating said plane object parallel to a plane passing through said projection lens and a horizontal line in the plane of said screen which line is the intersection with the plane of said screen of a second plane passing through a viewpoint at said student's station and parallel to the simulated plane area, said projection lens being characterized by a difference of angular magnifications in two mutually perpendicular planes as measured at said projection lens, said magnification difference being equal to the ratio of the distance from said lens to said intersection line in the plane of the screen and the distance from said viewpoint to said intersection line, driving means for imparting relative motion between said object and the optical axis of said projector, means coupling said driving means with the controls at said student's station whereby said driving means are operated to impart said relative motion in accordance with simulated aircraft movement, means coupling said lens system with the controls at said station for varying the magnification of projected images in accordance with simulated variations in altitude, and means coupled with said controls for producing relative rolling and pitching motions between said student's station and said screen.

22. Flight simulating apparatus comprising a student's station having controls simulating the controls of an aircraft, a plane object which is an undistorted facsimile to a reduced scale of a plane area the undistorted appearance of which is to be simulated for observation from said student's station, a projection lens horizontally displaced from said student's station, means for illuminating said object and directing the resultant illumination from said object into said projection lens, a projection screen disposed at an angle with respect to said simulated plane area to receive said illumination, means locating said plane object parallel to a plane passing through said projection lens and a horizontal line in the plane of said screen which line is the intersection with the plane of said screen of a second plane passing through a viewpoint at said student's station and parallel to the simulated plane area, said projection lens being characterized by a difference of angular magnifications in two mutually perpendicular planes as measured at said projection lens, said magnification difference being equal to the ratio of the distance from said lens to said intersection line in the plane of the screen and the distance from said viewpoint to said intersection line, driving means for moving said plane object with respect to the longitudinal and lateral axes of said object, further means coupling said driving means with the controls at said student's station whereby said driving means are operated laterally and longitudinally in accordance with simulated aircraft movements, means for varying the image magnification of said projector lens system, means coupling said last-named means with said controls for varying the magnification of said projector lens system in accordance with simulated variations in altitude, and means responsive to said controls for imparting rolling and pitching motions to said student's station relative to said screen.

23. In flight simulating apparatus, a trainee's station representing the cockpit of an aircraft, a plane object which is an undistorted facsimile to a reduced scale of a plane area the undistorted appearance of which is to be simulated for observation from said trainee's station, a projection lens horizontally displaced from said trainee's station, means for illuminating said object and directing the resultant illumination from said object into said projection lens, a projection screen disposed at an angle with respect to said simulated plane area to receive said illumination, means locating said plane object parallel to a plane passing through said projection lens and a horizontal line in the plane of said screen which line is the intersection with the plane of said screen of a second plane passing through a viewpoint at said trainee's station and parallel to the simulated plane area, said projection lens being characterized by a difference of angular magnifications in two mutually perpendicular planes as measured at said projection lens, said magnification difference being equal to the ratio of the distance from said lens to said intersection line in the plane of the screen and the distance from said viewpoint to said intersection line, a plurality of adjustable controls at said station corresponding to the controls of an aircraft, means in said projector for imparting motion to images projected thereby, and means connecting said last named means with said controls whereby the motion of said projected images is caused to simulate flight motions as viewed from said trainee's station.

24. In flight simulating apparatus the combination comprising a trainee's station simulating the cockpit of an aircraft, a plane object which is an undistorted facsimile to a reduced scale of a plane area the undistorted appearance of which is to be simulated for observation from said trainee's station, a projection lens horizontally displaced from said trainee's station, means for illuminating said object and directing the resultant illumination from said object into said projection lens, a projection screen disposed at an angle with respect to said simulated plane area to receive said illumination, means locating said plane object parallel to a plane passing through said projection lens and a horizontal line in the plane of said screen which line is the intersection with the plane of said screen of a second plane passing through a viewpoint at said trainee's station and parallel to the simulated plane area, said projection lens being characterized by a difference of angular magnifications in two mutually perpendicular planes as measured at said projection lens, said magnification difference being equal to the ratio of the distance from said lens to said intersection line in the plane of the screen and the distance from said viewpoint to said intersection line, a plurality of adjustable controls at said station simulating aircraft operating controls, means for moving said plane object with respect to the optical axis of said projector, means coupling said controls with said further means to control the movement of said supporting means in accordance with simulated flight motions, and means for producing relative motion between said station and images formed by said projector in simulation of aircraft roll and pitch movements.

25. Ground training apparatus comprising in combination, a student's station, simulated aircraft controls operable from said station, a plane object which is an undistorted facsimile to a reduced scale of a plane area the undistorted appearance of which is to be simulated for observation from said student's station, a projection lens horizontally displaced from said student's station, means for illuminating said object and directing the resultant illumination from said object into said projection lens, a projection screen disposed at an angle with respect to said simulated plane area to receive said illumination, means locating said plane object parallel to a plane passing through said projection lens and a horizontal line in the plane of said screen which line is the intersection with the plane of said screen of a second plane passing through a viewpoint at said student's station and parallel to the simulated plane area, said projection lens being characterized by a difference of angular magnifications in two mutually perpendicular planes as measured at said projection lens, said magnification difference being equal to the ratio of the distance from said lens to said intersection line in the plane of said screen and the distance from said viewpoint to said intersection line, means for rotating said student's station about two mutually perpendicular axes, means connecting said simulated aircraft controls with said means for rotating said student's station whereby the motion of said student's station is responsive to the movements of said simulated aircraft controls, means for imparting translatory motion to said plane object in its own plane, means for rotating said plane object about an axis normal to its own plane, and means connecting said simulated aircraft controls with said motion imparting means to move and rotate said plane object in simulation of an aircraft flight over said plane area.

26. Ground training apparatus as in claim 25 which is further characterized by means responsive to movements of said simulated aircraft controls for varying the distance between said plane object and said projection lens, to simulate changes in the elevation of said student's station above said simulated plane area.

27. Grounded training apparatus as in claim 25 which is further characterized by means responsive to said simulated aircraft controls for varying the size of said plane object to simulate changes in the elevation of said student's station above said simulated plane area.

28. An image projection system comprising in combination, a plane object which is an undistorted facsimile to a reduced scale of a plane area the undistorted appearance of which is to be simulated for observation from a predetermined viewpoint, a first projection lens optically aligned with said object, means for illuminating said object and directing the resultant illumination from said object into said first projection lens to form an intermediate image of said object, a second projection lens positioned a substantial distance from said viewpoint, a field lens located substantially coincident with said intermediate image to direct the illumination forming said image into said second projection lens, a projection screen disposed at an angle with respect to said simulated plane area to receive the illumination from said second projection lens, said intermediate image being located parallel to a plane passing through said second projection lens and a line in the plane of said screen which is the intersection with the plane of said screen of a second plane passing through said viewpoint and parallel to the simulated plane area, the lens system comprising said first projection lens and said second projection lens being characterized by a ratio of system angular magnifications in two mutually perpendicular planes through said lens system, said system angular magnifications each being the product of the angular magnification of said first projection lens as measured at said first projection lens and the angular magnification of said second projection lens as measured at said second projection lens, said ratio being equal to the ratio of the distance from said second projection lens to said intersection line in the plane of said screen and the distance from said viewpoint to said intersection line in the plane of said screen.

29. An image projection system as in claim 28 which is further characterized by motion imparting means for moving said plane object in its own plane to simulate motion in a direction parallel to said simulated plane area, means for rotating said plane object about an axis normal to its own plane to simulate changes in heading direction, and means for varying the distances from said plane object to said first projection lens and from said first projection lens to said intermediate image to alter the size of said intermediate image in simulation of changes in elevation of said viewpoint above said simulated plane area.

30. An image projection system comprising in combination, a plane object which is an undistorted facsimile to a reduced scale of a plane area the undistorted appearance of which is to be simulated for observation from a predetermined viewpoint, a projection lens system, means for illuminating said object and directing the resultant illumination from said object into said lens system, said lens system comprising a plurality of objective lenses arranged so that the first objective lens forms an image of said plane object and each succeeding objective lens re-images that image formed by the preceding objective lens, a field lens located substantially coincident with each of said images formed between a pair of said objective lenses to redirect the illumination from said preceding objective lens toward the aperture of the next succeeding objective lens, means for changing the relative position of said plane object with respect to said objective lenses in said lens system to vary the over-all magnification in said lens system and simulate changes in distance of said viewpoint from said simulated plane area, a screen disposed at an angle with respect to said simulated plane area to receive the illumination from the last objective lens in said lens system, the image next preceding said last objective lens being located in a plane parallel to a plane passing through said last objective lens and a line in the plane of said screen which line is the intersection with said plane of said screen of a plane through said viewpoint parallel to said simulated plane area, said lens system being characterized by a difference of system angular magnification in two mutually perpendicular planes, the system angular magnification being the product of all the individual objective lens angular magnifications, the angular magnification of an objective lens being measured at that lens, said difference being equal to the ratio of the distance from said last objective lens to said intersection line in the plane of said screen and the distance from said viewpoint to said intersection line in the plane of said screen.

31. An image projection system as in claim 30 further characterized by means for moving said plane object in its own plane to simulate motion parallel to said simulated plane area.

32. An image projection system as in claim 31 further characterized by means for rotating said plane object about an axis normal to its own plane to simulate rotation about an axis normal to said simulated plane area.

33. An arrangement for imparting to an observer pitching or rolling motions or both in a simulated vehicle visually related to a scene optically projected from a flat transparency or the like, comprising an observer's station within the simulated vehicle, a screen visible to an observer from said station, said screen being fixedly mounted outside the simulated vehicle, and said screen being inclined from the horizontal and sloping downwardly in the direction toward the observer, optical projecting means having its optical axis inclined to the normal to the screen, means supporting a flat transparency or the like in a plane inclined from the screen at an operable angle for focusing an image of the transparency upon the screen, means to rotate the simulated vehicle about a horizontal transverse axis to impart a pitching motion to the observer, means to rotate the simulated vehicle about a horizontal longitudinal axis to impart a rolling motion to the observer, said transverse axis and said longitudinal axis intersecting at substantially the observer's viewpoint.

References Cited in the file of this patent

UNITED STATES PATENTS

| | | |
|---|---|---|
| 751,347 | Scheimpflug | Feb. 2, 1904 |
| 988,720 | Kohler | Apr. 4, 1911 |
| 1,204,030 | Kellner | Nov. 7, 1916 |
| 1,528,021 | Janzer | Mar. 3, 1925 |
| 1,790,232 | Flora | Jan. 27, 1931 |
| 1,829,634 | Chretien | Oct. 27, 1931 |
| 1,938,808 | Ceccarini | Dec. 12, 1933 |
| 1,950,166 | Durholz | Mar. 6, 1934 |
| 2,084,795 | Donle | June 22, 1937 |
| 2,131,952 | House | Oct. 4, 1938 |

(Other references on following page)

UNITED STATES PATENTS

| | | | |
|---|---|---|---|
| 2,335,700 | Rogers | Nov. 30, | 1943 |
| 2,336,436 | Beindorf | Dec. 7, | 1943 |
| 2,352,101 | Hutter | June 20, | 1944 |
| 2,373,313 | Jeandron | Apr. 10, | 1945 |
| 2,374,981 | Cooke | May 1, | 1945 |
| 2,406,574 | Waller et al. | Aug. 27, | 1946 |
| 2,420,316 | Hine | May 13, | 1947 |
| 2,462,150 | Wilkinson | Feb. 22, | 1949 |
| 2,485,435 | Dehmel | Dec. 18, | 1949 |
| 2,492,870 | Kelsh | Dec. 27, | 1949 |
| 2,518,419 | Dehmel | Aug. 8, | 1950 |
| 2,536,718 | Brandon | Jan. 2, | 1951 |
| 2,579,177 | Miles | Dec. 18, | 1951 |
| 2,591,752 | Wicklund | Apr. 8, | 1952 |
| 2,625,074 | Nistri | Jan. 13, | 1953 |
| 2,687,580 | Dehmel | Aug. 31, | 1954 |

FOREIGN PATENTS

| | | |
|---|---|---|
| 343,512 | Great Britain | Feb. 16, 1931 |
| 622,312 | Great Britain | Apr. 29, 1949 |